United States Patent [19]

Kuroki et al.

[11] Patent Number: 4,742,507
[45] Date of Patent: May 3, 1988

[54] OPTICAL INFORMATION RECORDING AND REPRODUCING APPARATUS HAVING DEFECTIVE-SECTOR MARKING MEANS

[75] Inventors: Yuzuru Kuroki, Moriguchi; Isao Satoh, Neyagawa; Makoto Ichinose, Sakai; Tatuo Sugimura, Fukuoka, all of Japan

[73] Assignee: Matsushita Electric Industrial Co., Ltd., Osaka, Japan

[21] Appl. No.: 819,261

[22] Filed: Jan. 16, 1986

[51] Int. Cl.$^4$ .............................................. G11B 7/00
[52] U.S. Cl. ...................................... 369/54; 369/58; 360/53
[58] Field of Search ...................... 369/54, 58; 360/31, 360/53, 78; 371/39

[56] References Cited

U.S. PATENT DOCUMENTS

| | | | |
|---|---|---|---|
| 4,420,807 | 12/1983 | Nolta et al. | 365/200 X |
| 4,546,462 | 10/1985 | Koishi et al. | 369/54 X |
| 4,558,446 | 12/1985 | Banba et al. | 360/53 X |
| 4,562,577 | 12/1985 | Glover et al. | 369/54 X |
| 4,633,471 | 12/1986 | Pereia et al. | 371/39 X |

FOREIGN PATENT DOCUMENTS

| | | | |
|---|---|---|---|
| 57-105869 | 7/1982 | Japan | 360/31 |
| 58-1809 | 1/1983 | Japan | 360/78 |
| 58-3103 | 1/1983 | Japan | 360/31 |
| 58-83312 | 5/1983 | Japan | 360/78 |

*Primary Examiner*—Aristotelis M. Psitos
*Attorney, Agent, or Firm*—Stevens, Davis, Miller & Mosher

[57] ABSTRACT

An optical information recording and reproducing apparatus for recording and reproducing information from an optical recording disc including an optically detectable guide track preliminarily divided into a plurality of sectors. In the case of an unerasable disc, if an uncorrectable error exists in any sector after data has been recorded and reproduced from the sector, it is necessary to process this sector so as to prevent further reproduction an again record the data in another sector. Also, when updating a part of the data or erasing the file, it is desirable to take a measure so that reproduction of the data in any unwanted sector is prevented. Also, in the case of any unrecorded sector involving such dropout that the recording of data is presumed to cause an uncorrectable error, it is desirable to handle it as a defective sector and process it so as to prevent the recording of data therein. In such a case, it is desirable to effect the similar process also in the case of an erasable disc. A conceivable method of making such defective or unwanted sector distinguishable at a later time is to write in its information recording area a signal having a special pattern indicative of the defective or unwanted sector. In accordance with the invention, the reliability of special signal detection is increased by writing the special signal again when it is impossible to detect the special signal due to the occurrence of a track jump prior to or during the writing of the special signal, due to the occurrence of dropouts or the like.

6 Claims, 8 Drawing Sheets

OPTICAL INFORMATION RECORDING AND REPRODUCING APPARATUS HAVING DEFECTIVE-SECTOR MARKING MEANS

BACKGROUND OF THE INVENTION

The present invention relates to an optical information recording and reproducing apparatus for recording and reproducing information from an optical recording disc including a guide track which is optically detectable and preliminarily divided into a plurality of sectors.

An optical information recording and reproducing apparatus is known in the art in which the laser beam from a laser light source 1 is converged to a tiny beam spot of less than 1 μm in diameter and projected onto a rotating optical recording disc coated with or having a vapor-deposited light-sensitive material, for example, and the output intensity of the beam spot is modulated with a recording signal thus ensuring real-time recording of information such as video signals or digital signals in the form of phase variations or such optical variations as reflectance or transmittance variations on the optical recording disc provided by the irregularities in its surface and also ensuring reproduction of the recorded information through the detection of the variations in the optical characteristics.

With this type of apparatus, for reasons of increasing the density of the recording tracks, ensuring the discrete partial writing or erasing of information and the like, an optical information recording and reproducing apparatus is conceivable in which the track or tracks to be recorded are preliminarily provided with an optically detectable guide track or tracks in the spiral or concentric form and a known tracking control is performed so as to cause a tiny spot of laser beam to follow the guide track thereby recording information on the selected track or reproducing the information from the selected track.

There is a known apparatus of this type in which in order to effectively utilize the recording area in the recording of digital information including variable length data, the tracks are each divided into a plurality of sectors and the recording and reproduction of information are effected sector by sector. FIG. 1 shows an example of the optical disc tracks having a sector structure. Each track is provided at its top with an index mark 1 indicative of the beginning of the track and each track includes N sectors each composed of a sector mark 2 having sector address information for identifying the sector and a data portion 3. When recording or reproducing data from the disc of this format, the sector mark of the desired sector is detected to identify it and then data is written in or read from the sector.

On the other hand, the recording dot and track pitch of the optical recording discs are on the order of 1 μm and thus various defects, foreign particles and flaws caused during the manufacture of the optical recording discs (the formation of guide tracks, the manufacture of replica discs, the vapor-deposition of recording material and the formation of protective layers) or by the environments in which they are used lead to dropouts of reproduced signals. Such dropouts deteriorate the raw error rate of the optical recording disc and also severe imperfections frequently affect the tracking control thus tending to cause the tiny spot of laser beam to jump from the track it is following to another track. This track jump may also be caused by any vibration, shock or the like imparted externally to the optical head.

While the recording and reproduction of the desired section is effected by detecting its sector mark and identifying it, where the sector mark of any sector having the recoded data is rendered undetectable due to a flaw or the like necessitating to subsequently write in the sector a special signal indicative of the defective or unwanted sector, it is necessary to use means for identifying this section in some way or other. In this case, while the usual method is to write a special signal in the target sector through the use of a timer or the like in accordance with a separate reference signal such as the index mark or the sector mark of the preceding sector, it is impossible to directly identify the target sector so that if the previously mentioned track jump occurs during the interval between the separate reference signal and the target sector in the special signal writing sequence, the special signal is erroneously recorded in any sector of another track.

SUMMARY OF THE INVENTION

It is an object of the present invention to provide an improved optical information recording and reproducing apparatus so designed that in the case of an optical recording disc of the type which records a special signal as a mark in any defective or unwanted sector, if the recording or detection of a special signal is rendered impossible due to a track jump, dropout of the optical recording disc or the like, the special signal is written again by shifting its position depending on the number of times of writing thus decreasing the probability that the writing of the special signal in the target sector will be rendered impossible by a track jump and also preventing the special signal from being written doubly at the same position.

DESCRIPTION OF THE PREFERRED EMBODIMENT

In the case of an unerasable disc, when the data previously recorded in some sector is read and it is determined that the resulting demodulation error is not correctable, it is necessary to take a measure so that the data in this sector is no longer reproduced and then the data must be recorded again in another sector. Also, when updating a part of the data or when erasing the file, it is desirable to take a measure so that the data in the unwanted sectors are no longer reproduced.

Further, when there exists a dropout so that even if data is recorded in the information recording area of an unrecorded sector the proper reproduction of the data is presumed impossible and when the sector mark of any sector is not detected due to a flaw or the like making it impossible to identify this sector, it is desirable to take a measure so that no data is recorded again in such section and this is the same with erasable optical information recording discs.

A known method of identifying such a defective or unwanted sector is to write a signal having a particular pattern in the sector and the provision in each sector of an area for the writing of a special signal indicative of a defective or unwanted sector deteriorates the utilization of the recording area including the preceding and following margins for the additional writing of the special signal. Also, if any defect exists in the area, there is the danger of the detection of the special signal becoming impossible. Thus, it is conceivable to use a method of writing a defective or unwanted sector indicative special signal in the information recording area as disclosed in Japanese Patent Application No. 59-43415 (Corrs. to U.S. patent application No. 673620 filed on Nov. 21, 1984 or EPC patent application No. 84114179.19 filed on Nov. 23, 1984, which may be herein incorporated by reference).

This method will now be described in detail with reference to the drawings.

Figure 1:
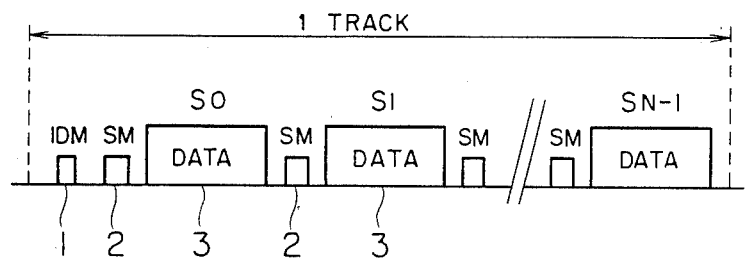
FIG. 1 illustrates a track format having a sector structure.
Figure 2:
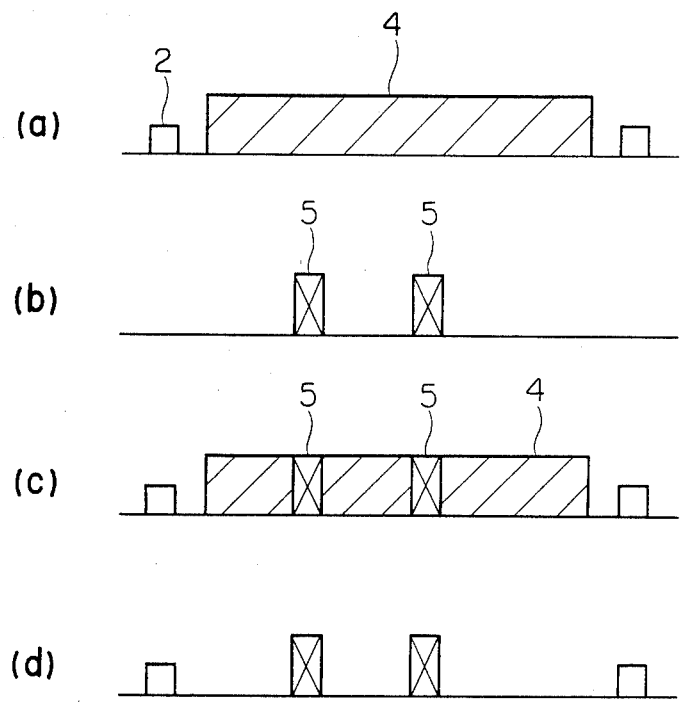
FIG. 2, consisting of (a)-(d), shows diagrams useful for explaining the conventional special signal writing operation.

Referring to FIG. 2, if any uncorrectable error occurs in recorded data 4 in (a) of FIG. 2, a signal 5 having a specific pattern as shown in (b) of FIG. 2 is written in superposition on the recorded data 4 as shown in (c) of FIG. 2. In the case of an unrecorded sector, the signal 5 is directly written as shown in (d) of FIG. 2. A circuit is provided to detect the specific pattern written in this way and determine the defective or unwanted sector. In this case, the pattern of a signal to be written may be a pulse train of a specific pattern which is longer than the maximum length between transition of the pulse trains in the recorded data.

Figure 3:
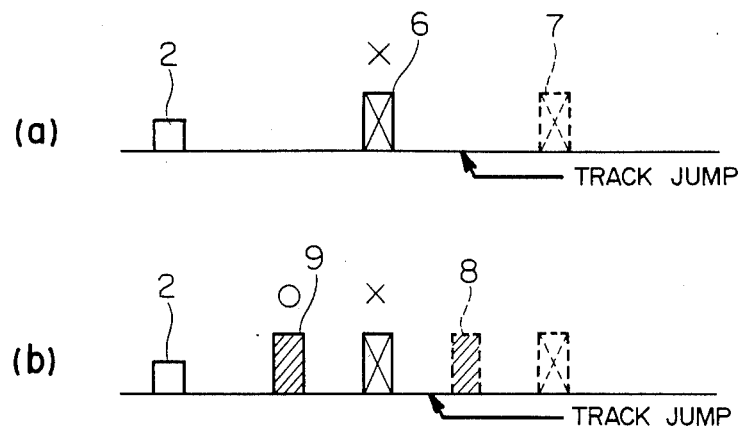
FIGS. 3 (a)-(b) and 4 (a)-(b) show diagrams useful for explaining the special signal writing operations performed in an embodiment of the invention.

An embodiment of the invention for coping with the occurrence of a track jump during the writing of such special signal in an unerasable disc will now be described with reference to FIGS. 3 and 4. Shown in (a) of FIG. 3 is a case of an unrecorded sector requiring the writing of two special signals to designate it as a defective or unwanted sector, in which after a first special signal 6 has been written the writing of a second special signal 7 fails due to a track jump caused by a flaw or the like of the optical recording disc and the detection of the first special signal 6 is rendered impossible due to a dropout or the like. After all, this sector cannot be determined as a defective or unwanted sector.

In accordance with the invention, as shown in (b) of FIG. 3, the writing positions are shifted forward and the same pattern is written again. In this way, a first special signal 9 is written properly, though it is impossible to write a second special signal 8 which comes behind the portion involving the occurrence of the track jump.

Figure 4:
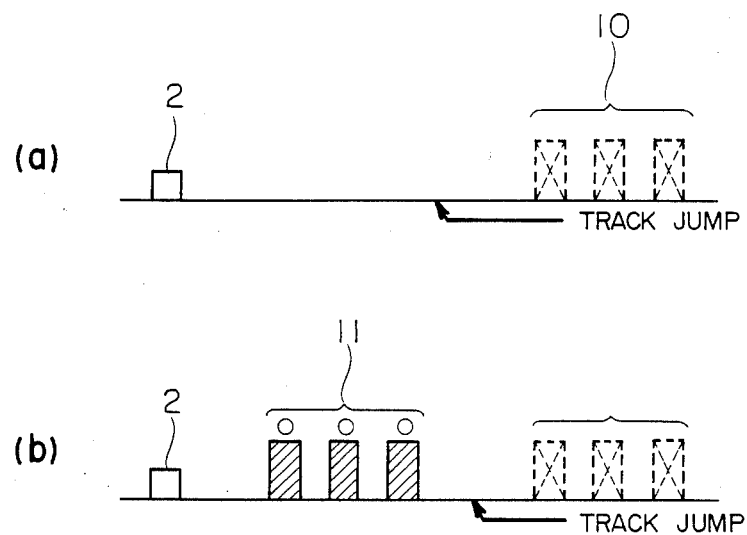

FIG. 4 shows a case where three special signals are written as a group and shown in (a) of FIG. 4 is a case where the writing of the special signal group 10 fails due to the occurrence of a track jump before the writing. Also in this case, a special signal group 11 is shifted forward and written as shown in (b) of FIG. 4 thus preventing the writing of the special signals from failing due to the track jump or the like.

Also, the rewriting of the special signals is necessary not only in the sector involving the occurrence of a track jump during the writing but also in the defective or unwanted sector where immediately after the writing of the special signals the detection of the specific pattern from the sector fails, that is, the recognition of the written special signals fails due to dropouts or the like of the optical recording disc and the second writing must take place at a place shifted from the initial writing positions so as to prevent the special signals from being written doubly at the same place. Shifting the writing positions of the special signals is also effective in such a case.

Next, the operation of writing a special signal in any sector whose sector mark is not detectable thus failing to identify it. When an error occurs in the sector mark portion due to a defect, flaw or the like of the optical recording disc so that the address of the target sector is not detected or when after data has been recorded in the normal condition a flaw or the like occurs thus necessitating the writing of a special signal, the required operation cannot be performed in the normal sequence.

Also, where the writing of a special signal in any unrecorded sector is required, the operation is not possible if the detection of the sector mark is not possible.

Figure 5:
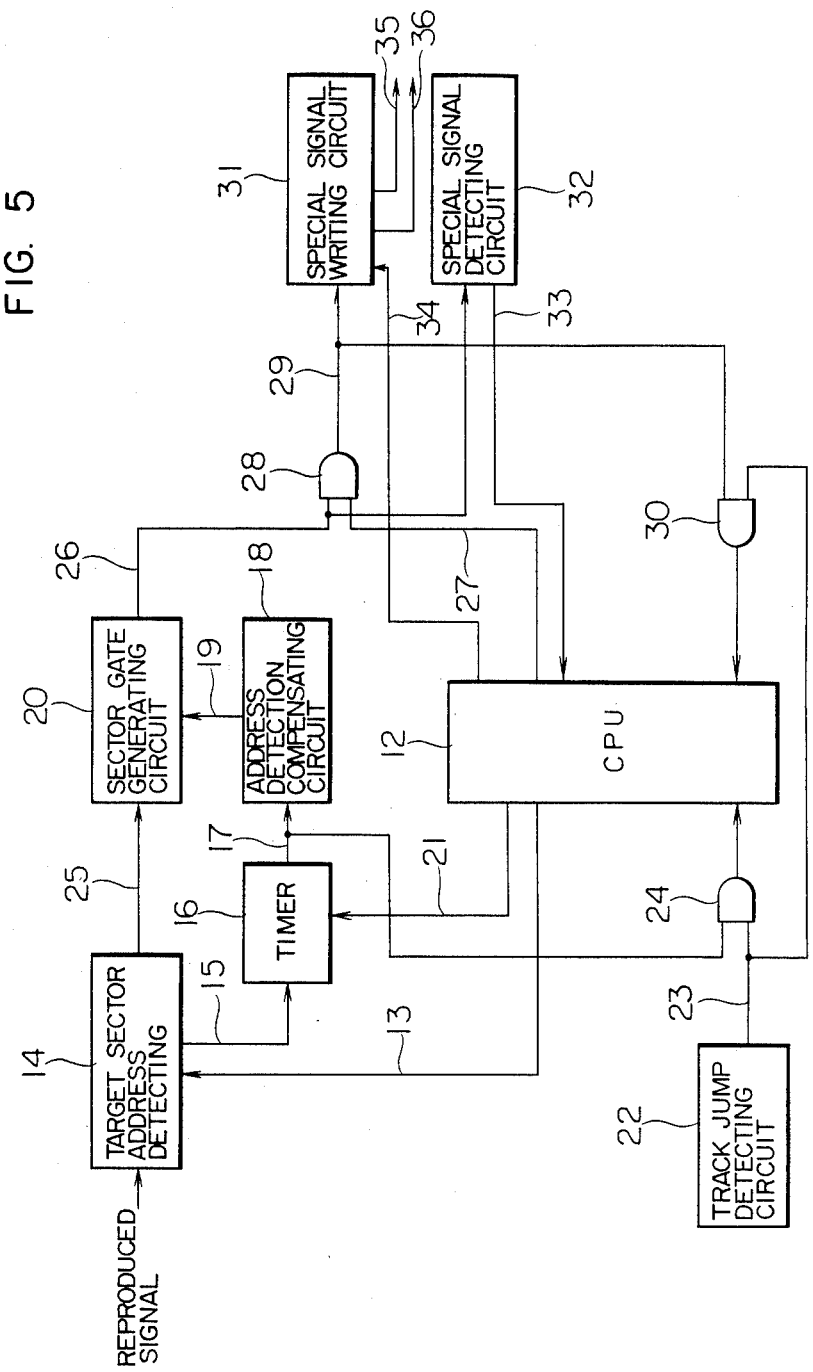
FIG. 5 is a block diagram of the special signal writing section of the optical information recording and reproducing apparatus according to the invention.

In such a case, the target sector is processed by utilizing a separate reference signal such as the index mark 1 indicating the beginning of the track or a normally detectable sector detection signal of the preceding sector. An example of such processing will now be described with reference to FIG. 5. When processing the sector whose sector address cannot be detected, the sector address of the sector preceding the target sector is sent as a target sector address setting signal 13 to a target sector address detecting circuit 14 from a CPU 12 (e.g., the Intell 8051) and a preceding sector address detection signal 15 is used as a trigger to operate a timer 16 which in turn sends a timer gate signal 17 to an address detection compensating circuit 18. Consequently, an address detection compensating signal 19 which will be described later is delivered to a sector gate generating circuit 20 so that a sector gate signal for the target sector is generated and the target sector is processed. A timer set time 21 is established by the CPU 12 in dependence on the selection of a reference signal such as the preceding sector mark or the index mark.

When effecting the writing of a special signal in the target sector by suing a separate reference signal in this way, if a track jump occurs during the search interval from the separate reference signal to the target sector or during the time that the timer is in operation, the special signal is erroneously written in any sector of another track since the sector address has not been identified. Thus, in accordance with the invention the AND operation is performed by an AND gate 24 on the timer gate signal 17 and a detection signal 23 from a track jump detecting circuit 22 so that the CPU 12 recognizes the occurrence of the track jump during the search interval up to the target sector and the processing of the target sector is effected again from the beginning.

Figure 6:
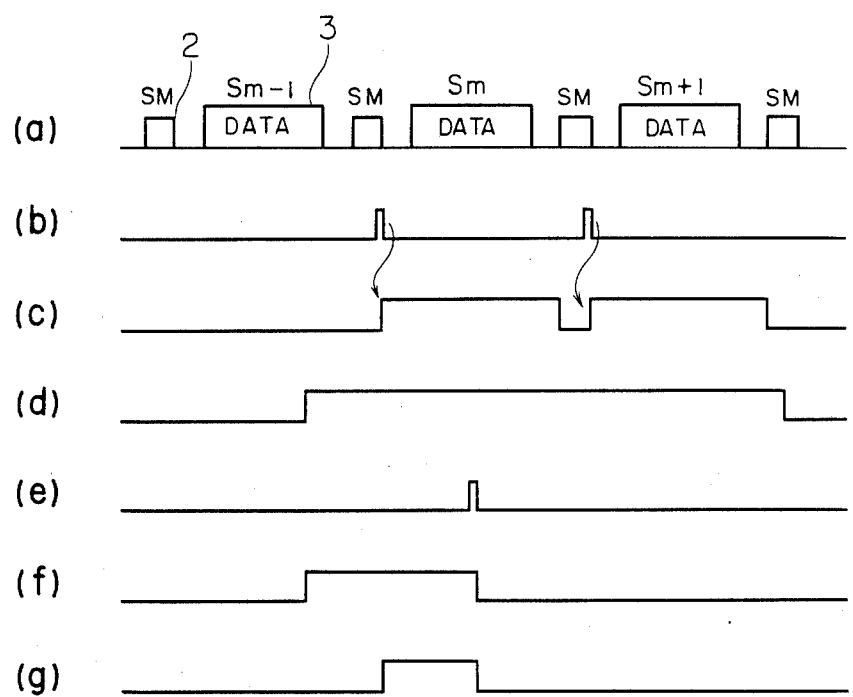
FIGS. 6 (a)-(g) and 7 (a)-(i) are timing charts showing respectively cases where the sector detection is effected properly and where the sector detection is not possible thus utilizing a separate reference signal.
Figure 7:
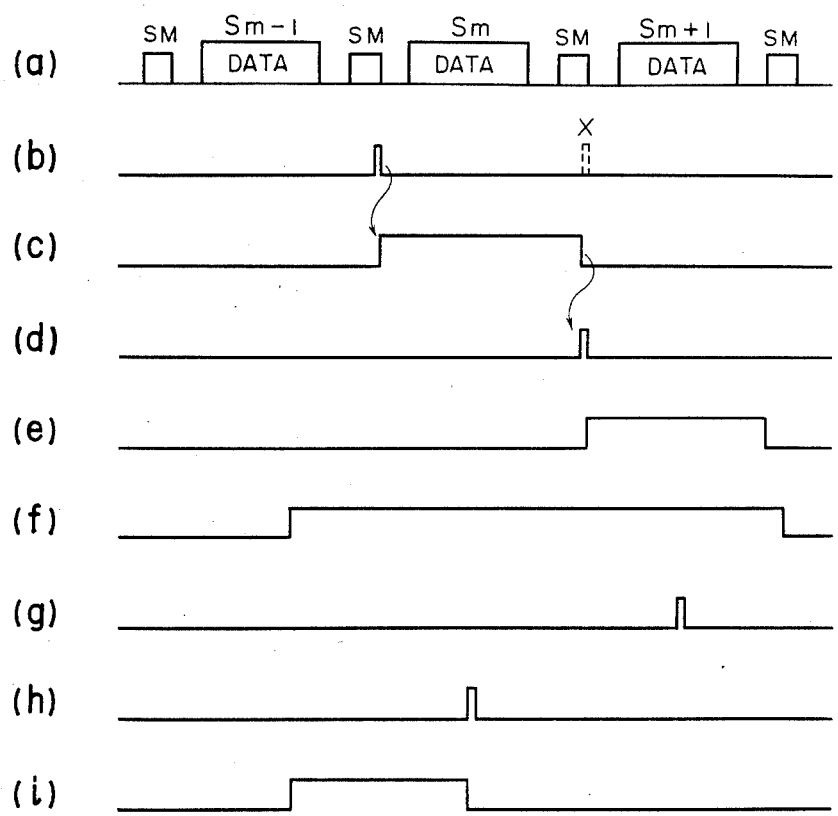

FIGS. 6 and 7 show respectively a timing chart of a case in which the sector detection is effected properly and a timing chart of a case in which the sector detection is not possible thus requiring the use of a separate reference signal.

Shown in (a) of FIG. 6 is a sector reproduced signal. A description will now be made of a case in which special signals are written in two of three sectors Sm−1, Sm and Sm+1, i.e., the sectors Sm and Sm+1 and it is assumed that data 3 was not recorded in the data field in (a) of FIG. 6 during the data recording. Shown in (b) of FIG. 6 are sector address detection signals 25 and shown in (c) of FIG. 6 are sector gate signals 26 generated by the signals 25. In (d) of FIG. 6 is shown a special signal write command signal 27 from the CPU 12 and the logical product of the signals 26 and 27 is an enable signal 29 generated from an AND gate 28. This signal has the same waveform as the signal 26.

If a track jump detection signal 23 shown in (e) of FIG. 6 is generated during the writing of a special signal, the CPU 12 detects it in response to the output from an AND gate 30 and the command signal 27 in switched off as shown in (f) of FIG. 6. When this occurs, the enable signal 29 is also switched off as shown in (g) of FIG. 6 and the special signal writing sequence is interrupted. Then, when the special signal is not detected from the sector causing the track jump, the specific signal is written at a position shifted from the previous one.

FIG. 7 is a timing chart of a case in which the detection of the sector address of the sector Sm+1 is not possible and therefore the special signal is written on the basis of the sector detection signal of the sector Sm whose sector address is normally detectable. Shown in (a) of FIG. 7 is a reproduced signal and shown in (b) of FIG. 7 are sector address detection signals. It is assumed that the detection of the sector address detection signal of the sector Sm+1 is not possible. The timer 16 is brought into operation by the sector address detection signal of the sector Sm shown in (b) of FIG. 7 and the timer 16 generates a timer gate signal 17 as shown in (c) of FIG. 7. In response to the trailing edge of the timer gate signal 17, the address detection compensating signal 19 of the sector Sm+1 shown in (d) of FIG. 7 is generated and the sector gate signal 26 of the sector Sm+1 shown in (e) of FIG. 7 is generated in response to the address detection compensating signal 19. Shown in (f) of FIG. 7 is the special signal write command signal 27 from the CPU 12.

When a track jump is detected by the detection signal 23 as shown in (g) of FIG. 7 during the time that the sector gate signal 26 of the sector Sm+1 is appearing during the writing of the special signal, in the same way as the sequence shown in FIG. 6, the writing of the special signal in the target sector is stopped so that if no special signal is detected from the sector, the writing position is shifted and the special signal is written again as mentioned previously. If a track jump is detected as shown in (h) of FIG. 7 when the timer gate signal 17 is appearing, the command signal 27 from the CPU 12 is switched off as shown in (i) of FIG. 7 and the special signal is written again at the same position.

As regards the track jump detection, methods are known in the art in which, as disclosed in Japanese Patent Unexamined Publication No. 57-121898, a tracking error signal caused during the crossing of a groove is detected and therefore its detailed description will not be made. If a special signal detecting circuit 32 detects the special signal in the reproduced signal of any sector which is to be recorded or reproduced, an interrupt signal 33 is sent to the CPU 12 and the recording or reproduction of this sector is prevented.

Special signal detection methods are known in the art in which, as disclosed in Japanese Patent Examined Publication No. 59-43415, for example, a pulse train longer than the maximum length between transition of sector recorded data is recorded and the pulse train is detected from a reproduced signal.

Figure 8:
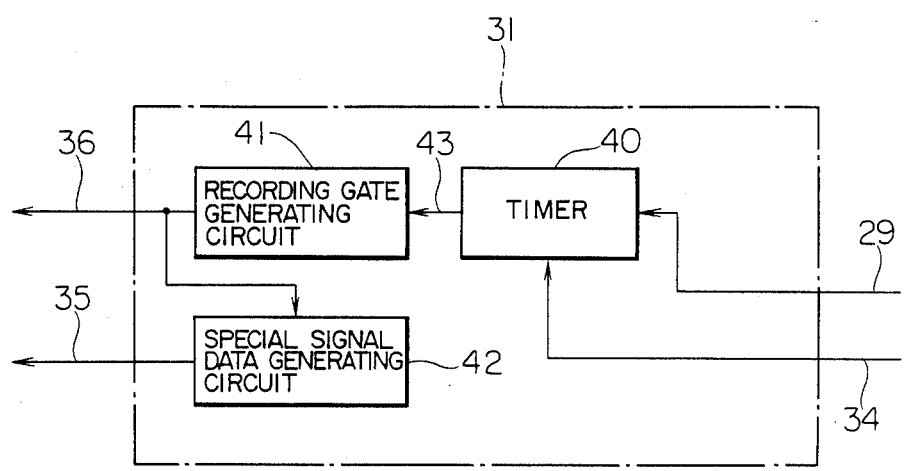
FIG. 8 is a block diagram of the special signal writing circuit.

FIG. 8 shows a detailed construction of the special signal writing circuit 31. The operation of a timer 40 is started by the sector enable signal 29 and its time interval is determined by a special signal write setting signal 34 from the CPU 12. A recording gate generating circuit 41 generates a special signal recording gate 36 for a predetermined period of time after the expiration of the timer operation. In response to the recording gate 36, a special signal pattern generating circuit 42 generates special signal data 35.

Figure 9:
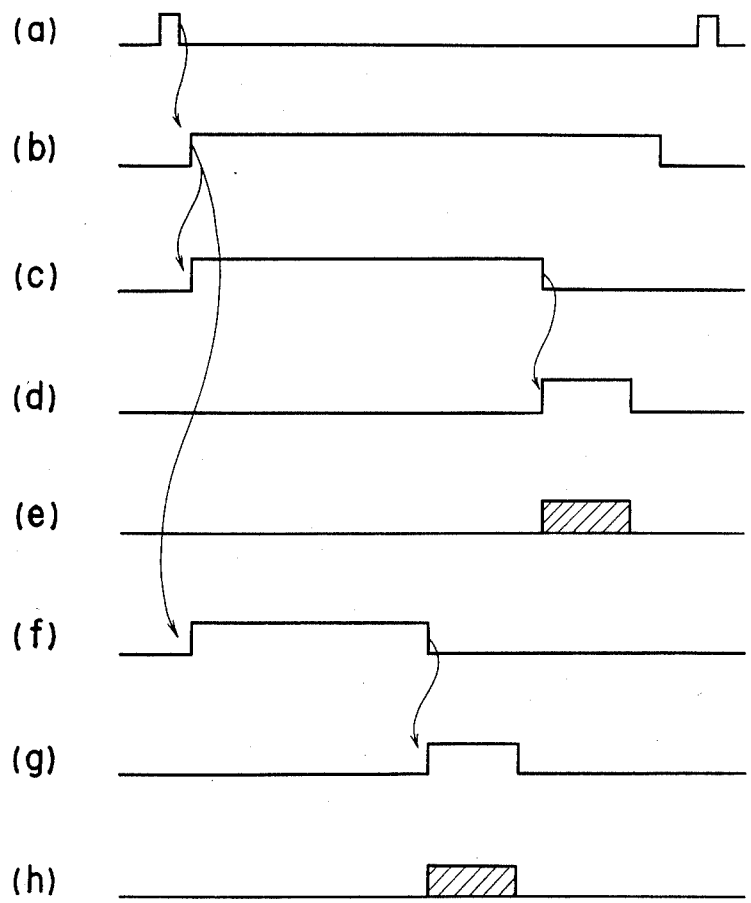
FIG. 9 (a)-(h) is a timing chart for explaining the special signal writing operation.

FIG. 9 shows a timing chart for explaining the special signal writing operation. The sector enable signal 29 shown in (b) of FIG. 9 is generated in response to the sector address detection signal shown in (a) of FIG. 9. When writing the special signal, the operation of the timer 40 is started in response to the leading edge of the sector enable signal 29 and a special signal recording gate 36 is generated as shown in (d) of FIG. 9 for a predetermined time from the trailing edge of the timer output signal 43 shown in (c) of FIG. 9. Then, as shown in (e) of FIG. 9, special signal data 35 is generated in synchronism with the special signal recording gate 36 and the writing operation for the target sector is effected. The signals in (f), (g) and (h) of FIG. 9 respectively correspond to the signals in (c), (d) and (e) of FIG. 9, showing that when writing again the special signal in the same sector, the writing position of the special signal is shifted so that the second position is advanced as compared with the first position.

Figure 10:
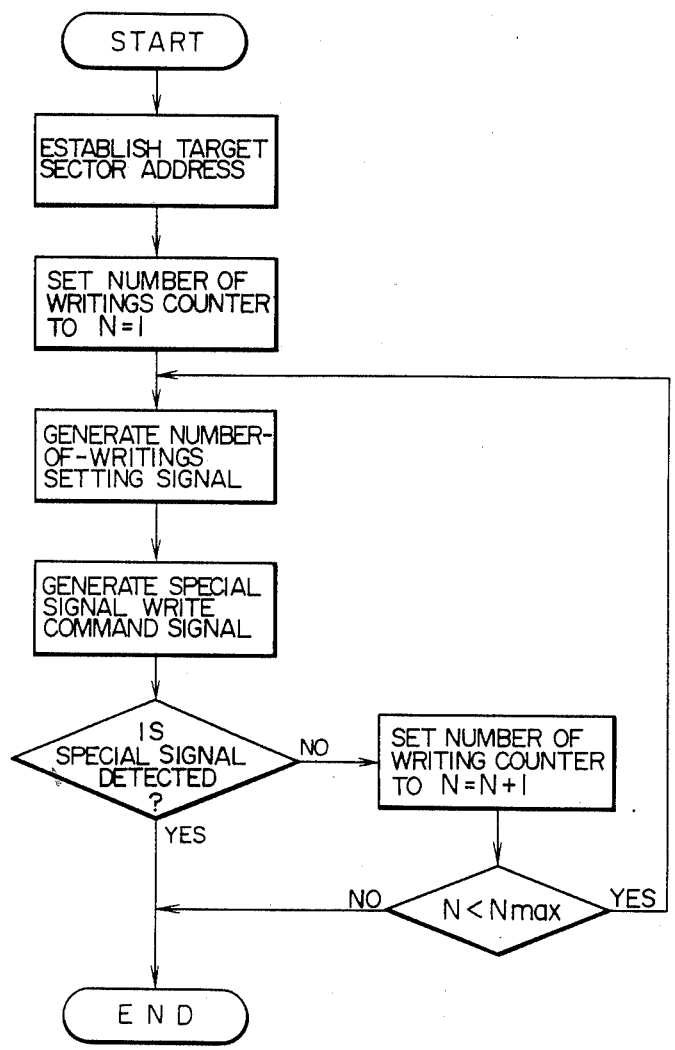
FIG. 10 is a flow chart showing the special signal writing operation of the CPU.

FIG. 10 is a flow chart showing the operations of the CPU during the writing or reading of the special signal. When writing the special signal in a certain sector, the CPU establishes the address of the sector and a counter for indicating the number of times of writing is set to N=1. Then, the number of times of writing N and a special signal write command signal are sent thereby effecting the writing of the special signal. After the writing has been completed, it is determined whether the detection of the special signal from the target sector is possible so that if it is not, the number of times N is set to N=N+1 and the writing is effected again if the value of N is less than the maximum number of times Nmax that the writing in one sector can be effected by shifting the writing position. In this way, the special signal is positively written in the target sector.

From the foregoing description it will be seen that in accordance with the invention, by virtue of the fact that if, during the writing of a special signal in any defective or unwanted sector of an optical recording disc, the writing or detection of the special signal is rendered impossible due to a track jump, dropout of the disc or the like, the writing is effected again by shifting forward the position of the special signal in dependence on the number of times of writing, there are great practical effects in that the probability of failure to write the special signal in the target sector due to a track jump is decreased and that the danger of writing the special signal doubly at the same position is eliminated.

We claim:

1. An optical information recording and reproducing apparatus for an optical recording disc having optically-detectable guide tracks divided into a plurality of sectors, said apparatus comprising:

recording/reproducing means for recording and reproducing information sector-by-sector on said disc by a laser beam;

writing means for writing into an information recording area of a particular sector of one of said guide tracks at least one special signal having a different signal pattern from a signal pattern of an information recording signal to be recorded in said information recording area;

special signal detecting means for (i) receiving reproduced information signals from said particular sector, (ii) detecting the special signal from said reproduced information signals, and (iii) detecting whether said special signal has been properly written into said particular sector;

counter means, responsive to said writing means, for providing a counter output signal indicating a number of times said special signal is written into said particular sector;

signal-position setting means for providing a signal to said writing means to set positions within said information recording area of special signals to be written into said sector;

said writing means comprising means for writing said special signal again into said particular sector responsive to said special signal detecting means detecting that said special signal has not been properly written into said particular sector; and said signal-position setting means comprising means, responsive to said counter output signal from said counter means, for providing signals to said writing means to set positions of said special signal to be written again into said particular sector at different positions from positions at which special signals have already been written in said particular sector.

2. An apparatus as in claim 1, wherein said signalposition setting means comprises time counting means for counting a counting time interval from a reference signal of said sector and counting-time setting means for changing said counting-time interval responsive to said counter output signal from said counter means to change said counting time interval to set the position of said special signal to be written again into said particular sector at a position before that of an immediately preceding written special signal.

3. An apparatus as in claim 2, wherein said reference signal comprises one of a sector mark and sector address information for indentifying a top of said sector.

4. An apparatus as in claim 1, further comprising track-jump detecting means for (i) detecting a track-jump of said laser beam from a beam tracking track to another track, (ii) stopping said writing means during a write operation of a special signal in response to a detection of said track-jump of said laser beam possibly caused during a special signal write operation in said sector, (iii) causing said special signal detecting means to determine whether said special signal has been recorded in said track, (iv) causing said counter means to increase said counter-output signal by a magnitude representing a single count responsive to said detecting means detecting no special signal written in said track, and (v) causing said writing means to write said special signal again into said sector.

5. An apparatus as in claim 1, further comprising track-jump detecting means for detecting a track-jump of said laser beam from a beam tracking track to another track; and means, responsive to a determination that no reference signal can be detected for said particular sector, for counter a given search time interval from a reference signal associated with a preceding sector which precedes said particular sector to indicate a proper timing to write said special signal into said particular sector; and said track-jump detecting means comprises means for detecting, during a special signal write operation by said write means into said particular sector, a track-jump of said laser beam which occurs during said given search time interval, and responsive thereto, immediately stopping said special signal write operation and then reinitiating said special signal write operation without changing said counter output of said counter means.

6. An apparatus as in claim 5, wherein said reference signal comprises one of a sector mark and sector address information for identifying a top of said sector.

* * * * *